United States Patent [19]

Aldred

[11] 4,072,001
[45] Feb. 7, 1978

[54] MOWING MACHINES

[75] Inventor: Edward John Aldred, Ipswich, England

[73] Assignee: Ransomes Sims & Jefferies Limited, England

[21] Appl. No.: 707,095

[22] Filed: July 20, 1976

[30] Foreign Application Priority Data

July 28, 1975 United Kingdom ............... 31513/75

[51] Int. Cl.² ........................................... A01D 75/30
[52] U.S. Cl. .......................................... 56/7; 56/13.6; 56/15.9
[58] Field of Search ................... 56/7, 13.6, 15.7, 15.8, 56/15.9, 16.2, 11.9

[56] References Cited

U.S. PATENT DOCUMENTS

| 1,900,726 | 3/1933 | Moyer | 56/7 |
| 2,313,590 | 3/1943 | Scherer, Jr. et al. | 56/15.7 |
| 2,725,703 | 12/1955 | Roseman, Jr. | 56/7 |
| 2,830,421 | 4/1958 | Blue et al. | 56/7 |
| 3,612,573 | 10/1971 | Hoffman | 56/7 |
| 3,802,172 | 4/1974 | Mathews | 56/15.8 |
| 3,992,858 | 11/1976 | Hubbard et al. | 56/11.9 |

Primary Examiner—Jay N. Eskovitz
Attorney, Agent, or Firm—Browdy and Neimark

[57] ABSTRACT

In a mowing machine of the kind comprising a frame adapted to be mounted on a tractor three-point linkage, and a plurality of cutting units connected to the frame, including at least two laterally spaced side cutting units and a center cutting unit positioned so as, in use, to cut the swath between the two swaths cut by the side cutting units, the side cutting units are mounted directly on the frame, so that in use part of the weight of the frame is supported by the side cutting units, and the center cutting unit is mounted at the rear end of a mounting arm connected to the frame by a universal joint, biasing springs being connected between the frame and the mounting arm to increase the pressure exerted on the ground by the center cutting unit so that it takes some of the weight of the frame from the side units and ensures uniformity of cut. The universal joint between mounting arm and frame also allows the center unit to take the optimum line when the machine follows a curved path. Three-unit and five-unit embodiments are described.

13 Claims, 9 Drawing Figures

MOWING MACHINES

THIS INVENTION relates to mowing machines.

More particularly, the invention relates to mowing machines of the kind comprising a frame adapted to be mounted on a tractor three-point linkage, and a plurality of cutting units connected to the frame, including at least two laterally spaced side cutting units and a center cutting unit positioned so as, in use, to cut the swath between the two swaths cut by the side cutting units.

It is desirable that in use of such a machine the pressures exerted on the ground by each of the cutting units should be reasonably equal to that exerted by the other units. This is usually achieved in known machines by mounting each unit on the end of a support arm pivoted to the frame, so that the pressure of each unit on the ground is due to the weight of the unit alone, the weight of the frame being borne by the tractor. It is also usual to spring bias each unit upwards to relieve some of the weight of the unit from the ground. The mounting of the cutting units makes these known machines relatively complicated and also heavy.

According to this invention there is provided a mowing machine of the kind set forth, in which the side cutting units are mounted directly on the frame, so that in use part of the weight of the frame is supported by the side cutting units, and the center cutting unit is mounted on the end of a mounting arm connected to the frame and pivotal at least about a horizontal axis transverse to the direction of travel of the machine, and resilient biasing means are connected between the frame and the mounting arm to increase the pressure exerted on the ground in use by the center cutting unit.

The increase in the pressure exerted on the ground by the center cutting unit due to the resilient biassing means compensates for the fact that, in the absence of the biassing means, the cutting units mounted directly on the frame would carry the whole weight of the frame, the center unit supporting none of the weight owing to the pivotal connection of the mounting arm to the frame. In addition, when the machine is moving over undulating ground, so that the cutting units experience vertical acceleration as they move up and down, the resulting forces on the units mounted directly on the frame are greater than those on the center unit, since the mass which has to be accelerated by any one of the fixed units is effectively that of the unit plus part of the mass of the frame, whereas the mass which has to be accelerated by the center unit is only the mass of the unit itself. The biasing means are therefore preferably arranged so that, when the machine is stationary, the pressure exerted on the ground by the center cutting unit is somewhat greater than that of each of the side units.

Another problem of known machines is that of "feathering", i.e. leaving a line of grass uncut between the center unit and the side unit which is on the inside of the curve when the machine follows a curved path. This arises because of the cutting units remain in the same relative position when the machine moves from a straight to a curved path.

To avoid this problem, in a preferred form of the invention the center cutting unit is carried at the rear end of the mounting arm and the arm is connected to the frame by a universal joint allowing the arm to pivot about a vertical axis as well as a transverse horizontal axis. This enables the center cutting unit to move laterally relative to the side units when the machine follows a curved path, so that it can take up the correct position to cut the swath between the swaths cut by the side units.

Advantageously, the biasing means comprises two tension springs connected between the frame and a point on the mounting arm on the side of the universal joint remote from the center cutting unit, each spring extending upwards and laterally outwards from the arm so that the spring forces have lateral components tending to maintain the unit in a central position relative to the side units.

Suitably, each side cutting unit is pivotally mounted on the frame for movement about a horizontal axis parallel to the direction of travel of the mowing machine, to allow the units to follow transverse undulations in the ground. A similar pivotal movement of the center unit is allowed, the universal joint between the mounting arm of the center unit and the frame preferably being adapted to allow pivotal movement of the arm and center unit about a horizontal axis parallel to the direction of travel of the machine.

Some relative movement between the frame and the tractor is necessary to allow both side units to remain in contact with ground when the tractor moves over uneven ground. To allow for this, a short extra link member is inserted between each lower arm of the tractor three-point linkage and the lifting rod of the tractor which acts on the lower arm, the link member being pivotally connected at respective opposite ends to the lower arm and the lifting rod.

The invention can also be applied to mowing machines having more than three cutting units, for example to a five-unit machine.

The invention will now be described, by way of example, with reference to the accompanying drawings, in which.

Figure 1:
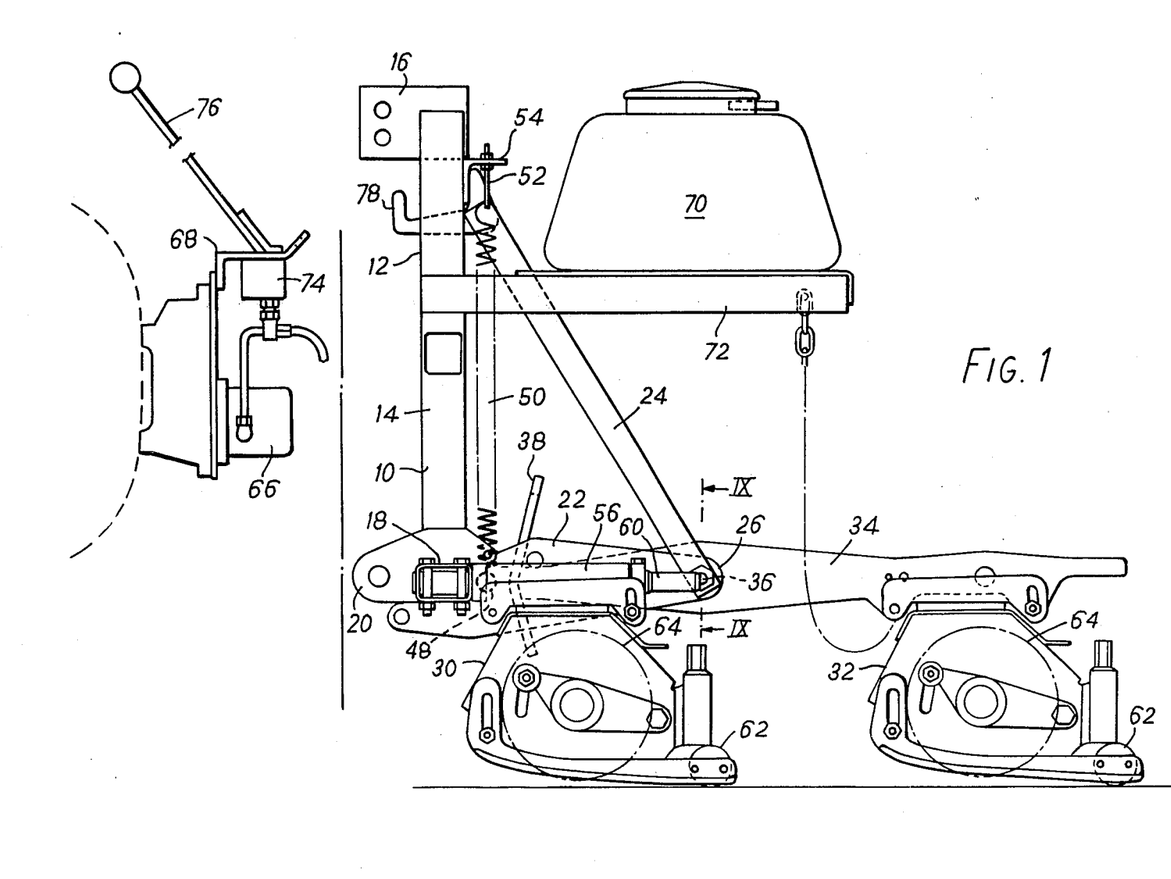
FIG. 1 is a side elevation of a mowing machine according to the invention.
Figure 2:
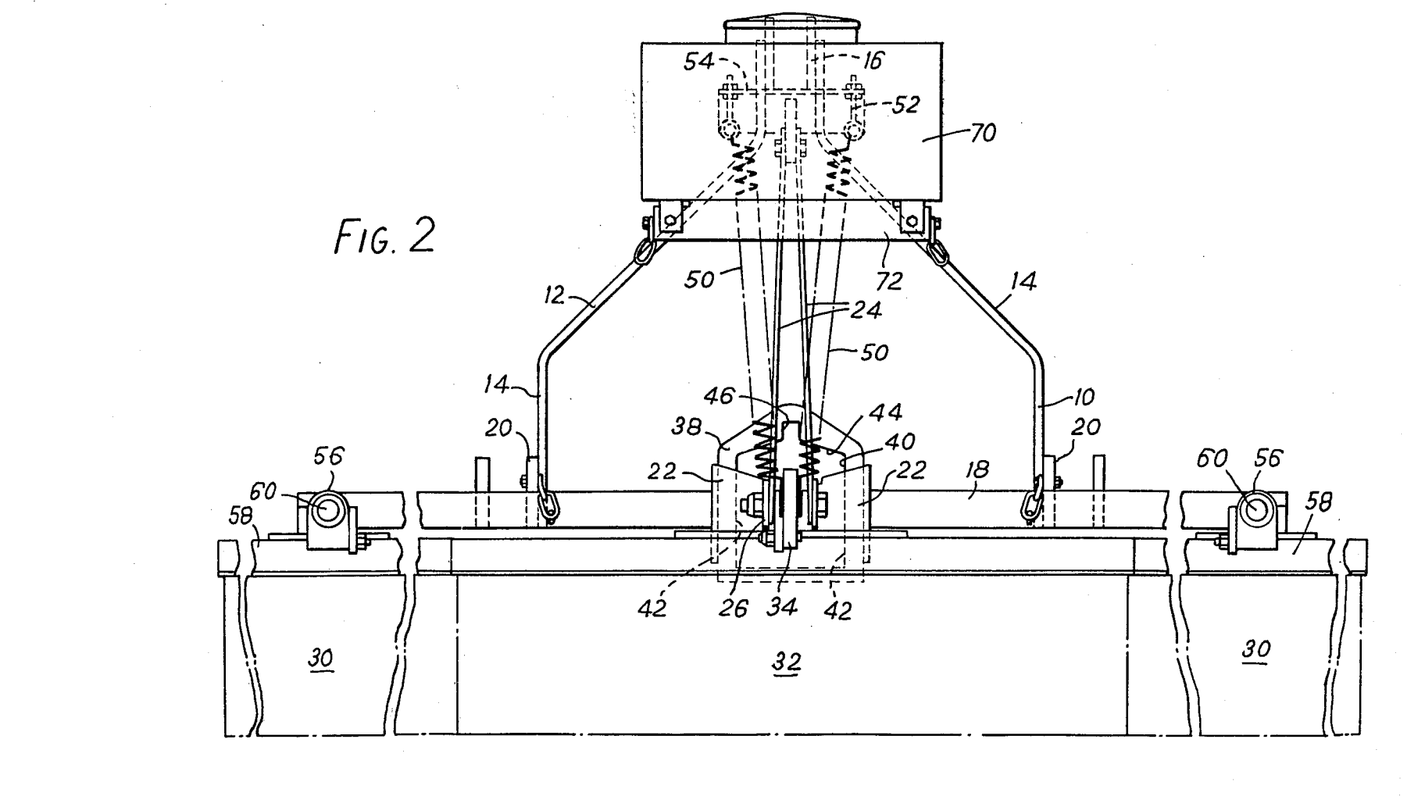
FIG. 2 is a rear elevation of the machine of FIG. 1.
Figure 3:
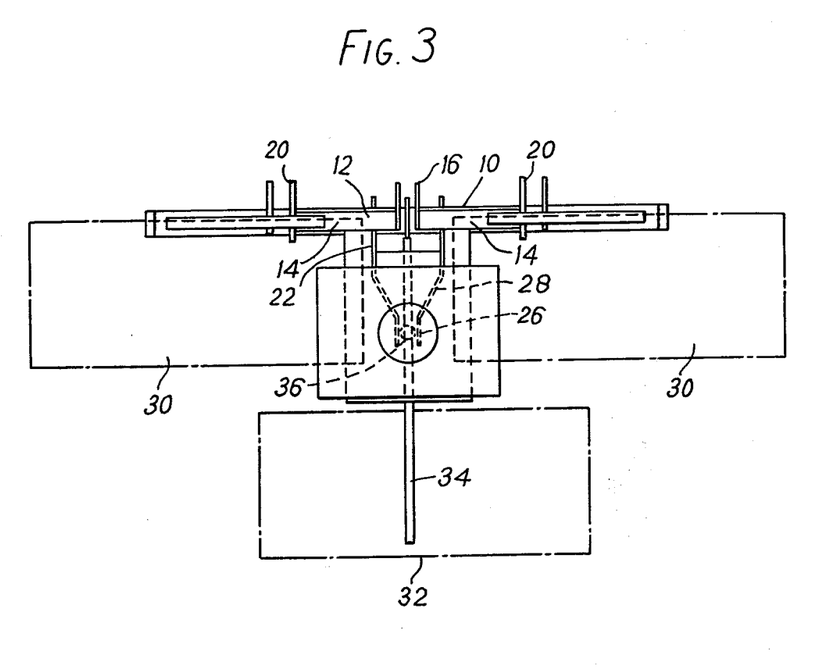
FIG. 3 is a plan view of the machine of FIGS. 1 and 2.

Referring to FIGS. 1 to 3, a mowing machine comprises a frame 10 adapted to be mounted on the three-point linkage of a tractor, and two side cutting units 30 and a center cutting unit 32 carried on the frame 10.

The frame 10 comprises an A-frame 12 having two side members 14 fixed at the upper ends to a link member 16 adapted to be connected to the tractor top link 86 (FIG. 4) and at their lower ends to a transversely extending box-section frame member 18. Two link members 20 fixed to the frame member 18 provide points of attachment to the tractor lower arms 82.

Figure 9:
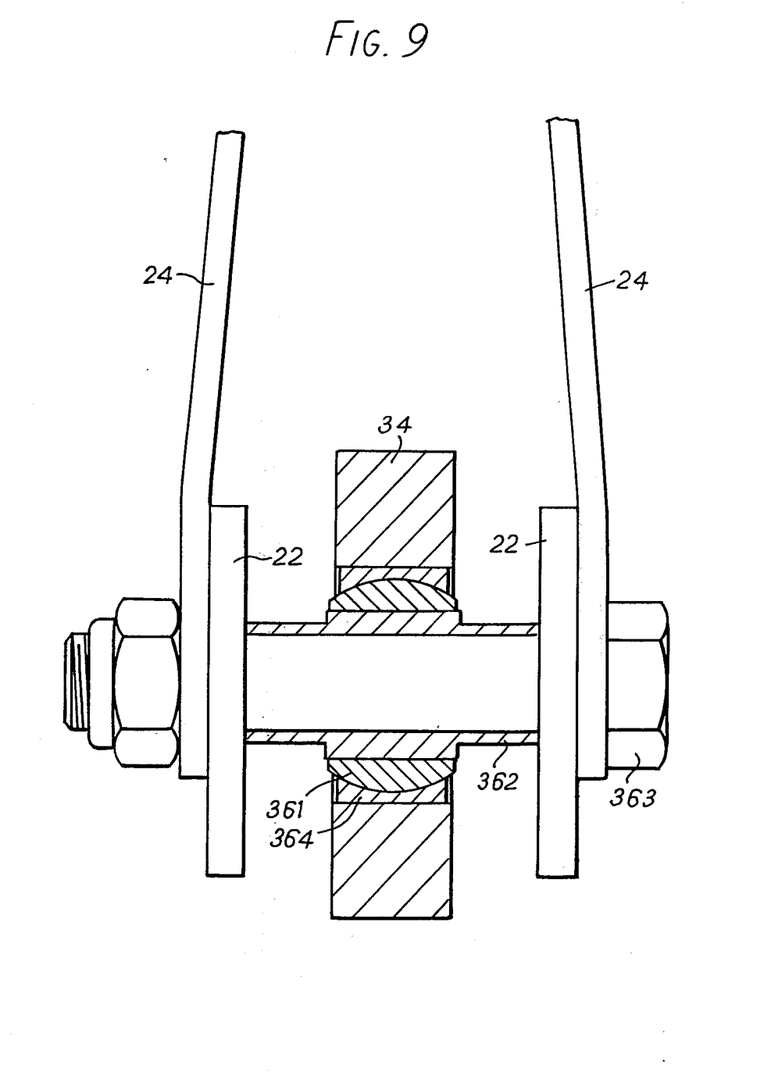
FIG. 9 is a cross-section on line 1X—1X of FIG. 1.

Fixed to the transverse frame member 18 near its mid-point are two rearwardly extending frame members 22. A pair of reinforcing struts 24 extend between rear end portions 26 of the frame members 22 and the upper part of the A-frame 12, to make the structure rigid and assist accurate location of the rear ends of the frame members 22 during assembly. A mounting arm 34 for the center cutting unit 32 extends between the rear ends of the rearwardly extending frame members 22 and is mounted on them by means of a ball joint 36 between their rear end portions 26. As shown in FIG. 9, the ball-joint 36 comprises a spherical bearing member 361 fixed by a suitable adhesive to a sleeve 362 secured between the frame members 22 and struts 24 by means of a bolt 363, and a complementary bearing member 364 fixed to the mounting arm 34. The mounting arm 34 extends forwards from the ball joint 36 and projects through a generally square aperture 40 in a plate 38 fixed to the transverse frame member 18. The plate 38 is positioned between the forward ends of the rearwardly extending frame members 22 which are accordingly spaced apart a greater distance than their rear end portions 26, being joined to them by angled portions 28. The aperture 40 has two vertical side edges 42 which limit the lateral movement of the mounting arm 34 as described below. The upper edge 44 of the aperture 40 is in the shape of a shallow inverted "V", at the apex of which is an upwardly extending slot 46 shaped to receive the upper edge of the mounting arm 34.

Fixed to the front end of the mounting arm 34, which projects through the aperture 40 in the plate 38, is a link 48 to which are attached the lower ends of two helical tension springs 50. The upper ends of the springs 50 are attached to adjustable eye-bolts 52 fixed to a bracket 54 mounted near the upper end of the A-frame 12, the two points of attachment being spaced transversely from, and on opposite sides of the center line of the A-frame, so that the springs 50 are arranged in a V-formation as shown in FIG. 2.

Each of the side cutting units 30 is supported on the transverse frame member 18 by means of a sleeve 56 fixed to the top plate 58 of the unit and fitting over a horizontal shaft 60 fixed to the frame member 18 and extending parallel to the direction of movement of the machine. This arrangement enables the cutting unit to pivot about the shaft 60 so that it can follow transverse undulations on the ground. The rear cutting unit 32 is fixed rigidly to the rear end of mounting arm 34. The ball joint 36 allows some pivotal movement of arm 34 about a horizontal axis parallel to the direction of movement of the machine to enable the rear unit 32 to follow transverse undulations. Each of the cutting units 30 and 32 is supported by a rear roller 62 positioned behind the bottom blade (not shown) of the unit. The units may be similar (except as regards their mounting on the frame 10) to those of the mower described in British patent specification No. 1,437,261.

The cutting cylinder 64 of each of the cutting units 30 and 32 is driven by a reversible hydraulic motor (not shown) on the unit, the three motors being connected by flexible hoses to a pump 66, mounted on a bracket 68 attached in use to the tractor, and to a hydraulic reservoir and filtration unit 70 mounted on a platform 72 fixed to an upper part of the A-frame 12. The pump 66 is connected in use to the power take-off shaft of the tractor. Also mounted on bracket 68 is a control valve assembly 74 for controlling the flow of fluid to the hydraulic motors, the valves being actuated by control handle 76 which is so positioned that it can be operated by the driver from his seat on the tractor. The bracket 68 has a hole by means of which it can be suspended from a hook 78 on frame 10 when the machine is disconnected from the tractor.

Since the lower arm of the three point linkage of a tractor normally move as a pair, the transverse frame member 18 would then always remain parallel to the rear axle of the tractor. Some relative movement between the frame member 18 and the tractor is necessary to allow both side cutting units 30 to remain in contact with ground when the tractor moves over uneven ground. To allow for this, a short extra link member 80 is inserted between each lower arm 82 of the tractor three-point linkage and the lifting rod 84 of the tractor which acts on the lower arm 82, the link member 80 being pivotally connected at respective opposite ends to the lower arm 82 and the lifting rod 84.

Figure 4:
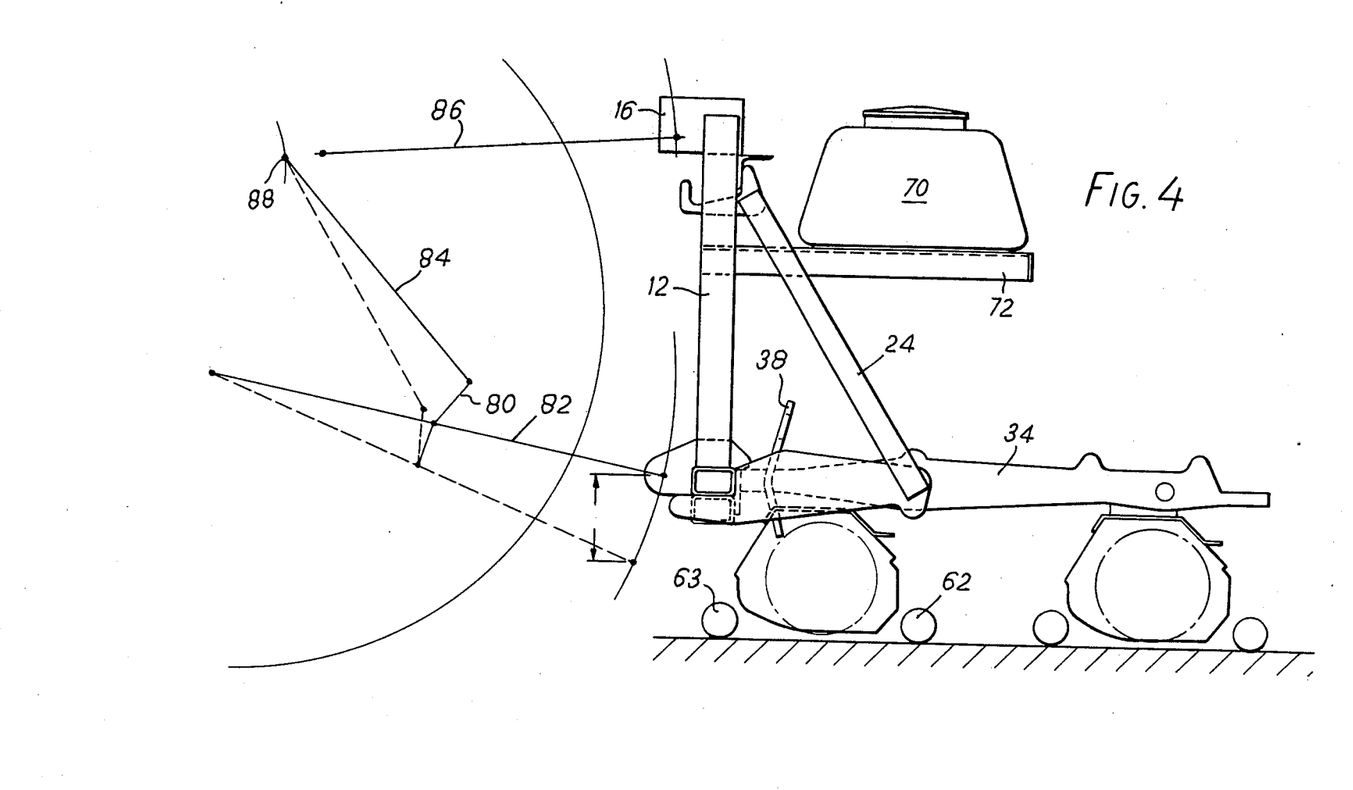
FIG. 4 is a diagrammatic side elevation of the machine of FIG. 1, but with a modified form of cutting unit, and of the three-point linkage of a tractor on which the machine is mounted.

FIG. 4 illustrates diagrammatically the movement of one lower arm 82 and lifting rod 84, between the position shown in solid lines and that in broken lines, which is allowed by the additional link without any movement of the upper end 88 of the lifting rod, and which can therefore take place independently of the other lower arm 82.

Figure 5:
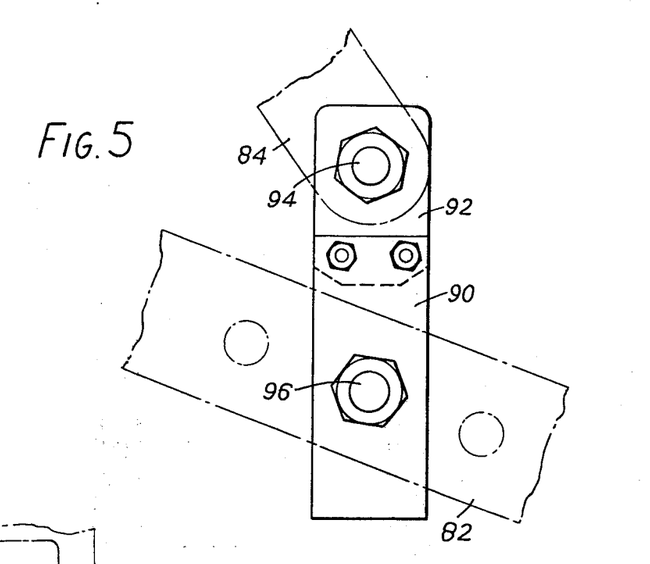
FIGS. 5 and 6 are respectively a side elevation and rear elevation, on a larger scale, of an additional link incorporated in the tractor three-point linkage of FIG. 4.
Figure 6:
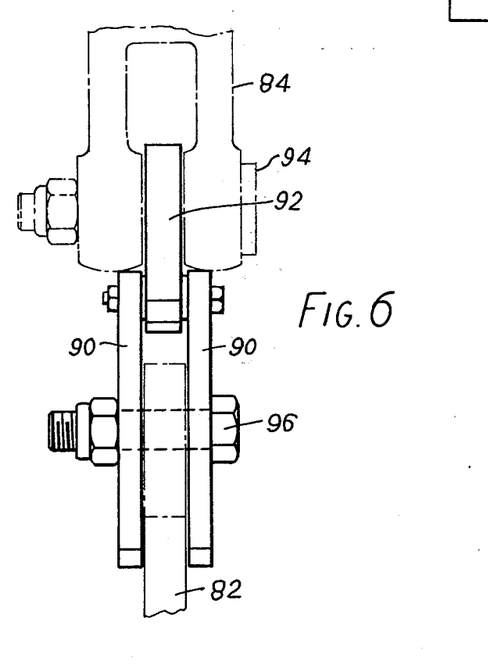

As shown in FIGS. 5 and 6, each additional link 80 consists of two plates 90 bolted to a third plate 92 to form a clevis. The plate 92 fits into the clevis at the end of the tractor lift arm 84, which has previously been disconnected from the lower arm 82, and is pivotally connected to it by bolt 94. The clevis formed by plates 90 is pivotally connected by bolt 96 to the lower arm 82 in plate of the lift rod clevis.

In operation, the tractor three-point linkage is operated to lower the frame 10 so that the cutting units 30 and 32 engage the ground. The tension springs 50 tend to rotate the arm 34 about a horizontal axis through the ball joint 36 and so increase the pressure with which the center cutting unit 32 bears on the ground. The center unit 32 thus bears some of the weight of the frame, which would otherwise be borne by the two side units 30 alone. If the static situation only had to be considered, the springs would be so arranged that the pressures exerted on the ground by all three cutting units were approximately equal. However, as pointed out above, when the machine is moving over undulating ground, the cutting units experience acceleration in the vertical direction, and the lower effective mass associated with the center unit 32 as compared with the side units 30 has the effect that the center unit tends to lose contact with the ground, e.g. on moving from level ground to sharply falling ground, giving rise to an uneven height of cut of the grass. To counteract this tendency, the springs 50 are arranged to increase the pressure exerted by the center unit 32 on the ground to a value somewhat above that of the side units 30. It has been found with practical tests on the machine shown in FIGS. 1 to 3 that the best results are achieved if the load on the center unit 32 is approximately 30% greater under static conditions than the load on each of the side units 30, i.e., with a distribution of the total weight of the machine supported by the units of 30% on the side units and 40% on the center unit. It will be apparent that with other machines falling within the scope of the invention the optimum weight distribution may be different from that just given, the optimum distribution in each case being a compromise between the optimum static loading of the units and the optimum loadings for the very varied dynamic situations which the machine meets in practice, and being preferably established by practical tests of the machine. In the machine of FIGS.

1 to 3, adjustment of the eye-bolts 52 enables the tension in springs 50 to be adjusted thereby to adjust the ground weight of the centre cutting unit 32. The adjustment can be made before the machine leaves the factory and also, if necessary, in the field.

The springs 50, because of their V-arrangement, also tend to maintain the center cutting unit 32 in a central position relative to the side units 30. When the machine moves from a straight to a curved path, the mounting arm 34 of the center cutting unit 32 pivots relative to the frame 10 and side units 30 about a vertical axis so that the center unit 32 takes up a position in which it follows the correct line to cut the swath of grass between those cut by the side units 30 as the machine moves along the curved path. The vertical sides 42 of the aperture 40 in plate 38 through which the mounting arm 34 extends act as stops to limit pivotal movement of the arm 34 when the machine turns sharply.

When the tractor three-point linkage is operated to lift the frame and cutting units from the ground, the weight of the center cutting unit 32 causes the mounting arm 34 to pivot about a horizontal axis so that it engages the upper edge 44 of the aperture 40 in plate 38. The shallow V-shape of the edge 44 guides the arm 34 into the slot 46 at the apex of the "V", so that, as the frame 10 is raised further to lift the center unit 32, the unit 32 is held in a fixed position for transport. The centralising effect of the tension springs 50 assists the movement of the arm 34 into the slot 46.

Figure 7:
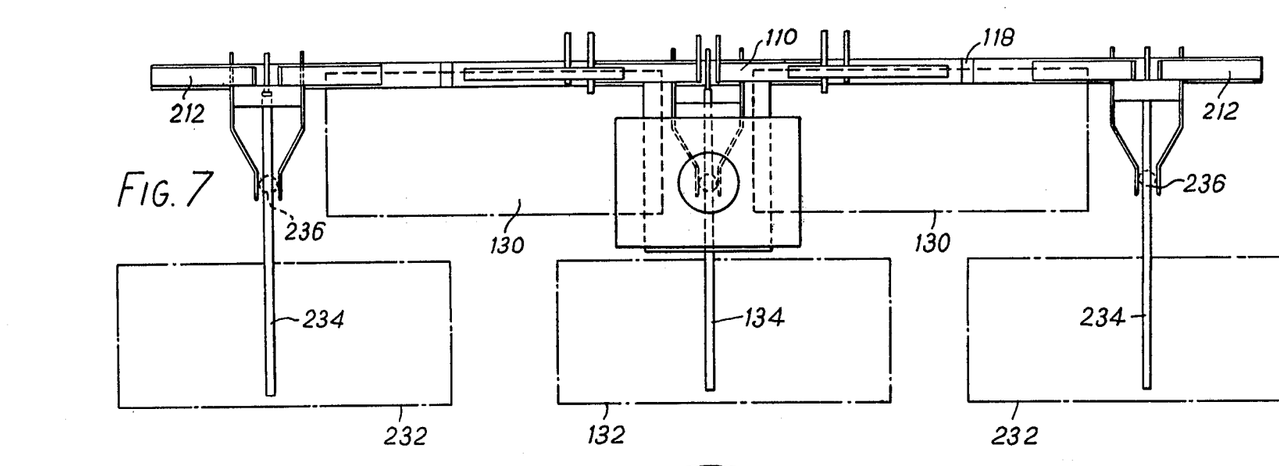
FIG. 7 is a diagrammatic plan view of a five-unit mowing machine according to the invention.
Figure 8:
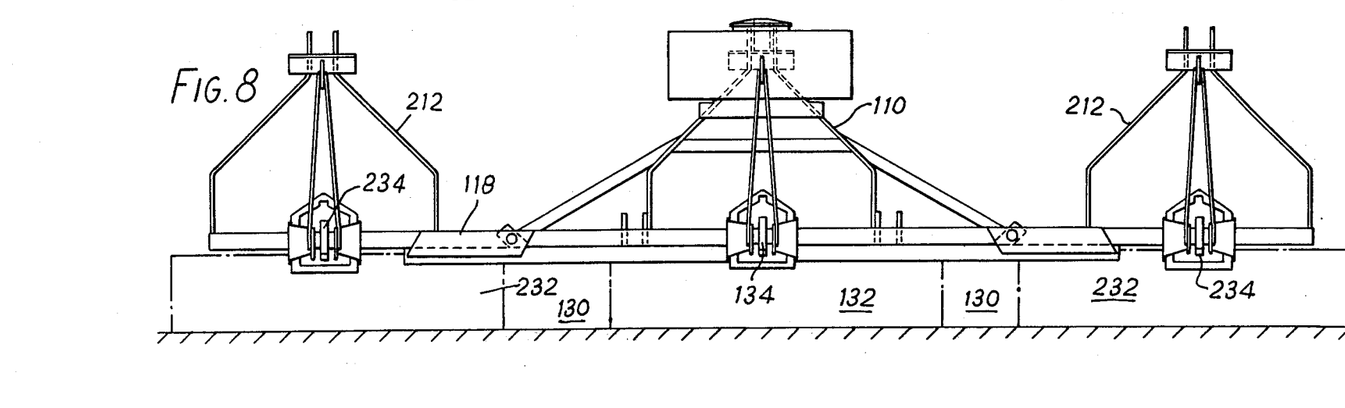
FIG. 8 is a diagrammatic rear elevation of the machine of FIG. 7.

FIGS. 7 and 8 show a mowing machine having five cutting units. The two front units 130 are fixed to a frame 110 in similar manner to the side units 30 of the first described embodiment, and the center rear unit 132 is carried on an arm 134 connected to the frame by a universal joint and biased by springs 150 in similar manner to the center unit 32 of the first described embodiment. The frame 110 is similar to frame 10 of the first described embodiment, but has a horizontal frame member 118 extending laterally beyond the two center units 130 and supporting at each end an A-frame 212. The rear side units 232 are each mounted on an arm 234 connected to the appropriate A-frame 212 by a universal joint 236 and springbiased by springs 250 in a similar manner to the center rear unit 132. The three rear units 132 and 232 can thus move independently as the mower travels over uneven ground. The springs 150 and 250 are arranged to give the optimum load distribution between the rear units 132 and 232 and the front units 130. When the frame 110 is lifted by the tractor three-point linkage, the rear units 132 and 232 are lifted on their arms 234 in similar manner to the center unit of the first described embodiment.

It will be appreciated that the cutting units employed in the described embodiments could take different forms. For example, FIG. 4 shows diagrammatically cutting units each supported on a front roller 63 as well as a rear roller 62, each unit being pivotally connected to the frame 10 or arm 34 for rotation about a transverse horizontal axis so that it can closely follow undulations in the ground in the direction of travel of the machine. As shown in FIG. 3, the rear part of arm 34 is shaped at its lower side to accommodate the cutting unit 32, and is shaped at its upper side to enable it also to accommodate the alternative cutting unit of FIG. 4, after the arm has been disconnected from ball-joint 36, inverted, and reconnected as shown in FIG. 4.

I claim:

1. A mowing machine comprising a frame adapted to be mounted on a tractor three-point linkage, and a plurality of cutting units connected to said frame, so that in use said cutting units are lifted to a transport position as said frame is raised by the tractor three-point linkage, including at least two laterally spaced side cutting units and a center cutting unit positioned so as, in use, to cut a swath between two swaths cut by said side cutting units, said side cutting units being mounted directly on said frame, so that in use part of the weight of said frame is supported by said side cutting units, and wherein said center cutting unit is mounted on an end of a mounting arm connected to said frame and pivotal at least about a horizontal axis transverse to the direction of travel of the machine, and wherein resilient biassing means are connected between said frame and said mounting arm for increasing the pressure exerted on the ground in use by the center cutting unit and for decreasing the pressure exerted on the ground in use by said side cutting units.

2. A mowing machine as claimed in claim 1, in which the biassing means are arranged so that, when the machine is stationary, the pressure exerted on the ground by the center cutting unit is greater than that of each of the side units.

3. A mowing machine as claimed in claim 1 in which the cutting unit is carried at the rear end of the mounting arm and the arm is connected to the frame by a universal joint allowing the arm to pivot about a vertical axis as well as the transverse horizontal axis.

4. A mowing machine as claimed in claim 3, in which the biassing means comprises two tension springs connected between the frame and a point on the mounting arm on the side of the universal joint remote from the center cutting unit, each spring extending upwards and laterally outwards from the arm so that the spring forces have lateral components tending to maintain the unit in a central position relative to the side units.

5. A mowing machine as claimed in claim 1 in which each side cutting unit is pivotally mounted on the frame for movement about a horizontal axis parallel to the direction of travel of the mowing machine.

6. A mowing machine as claimed in claim 3, in which the universal joint between the mounting arm of the center unit and the frame is adapted to allow pivot movement of the arm and center unit about a horizontal axis parallel to the direction of travel of the machine.

7. A mowing machine as claimed in claim 1, in which a stop member fixed to the frame is positioned so as to engage the mounting arm when the frame is lifted to a transport position by the tractor three-point linkage, thereby to lift the mounting arm and center cutting unit.

8. A mowing machine as claimed in claim 7, in which the stop member comprises a plate having an aperture through which the mounting arm passes the side of the aperture which engages the mounting arm on lifting the frame being shaped to guide the arm to a central transport position and hold it in that position whilst the frame remains in the transport position.

9. A mowing machine as claimed in claim 8, in which the sides of the aperture are positioned to act as stops limiting the lateral movement of the center cutting unit relative to the frame when the machine follows a curved path.

10. A mowing machine as claimed in claim 1, in which there are provided five cutting units consisting of the said center and side cutting units and two further cutting units arranged to cut swaths outside the swaths cut by the side units, each further cutting unit being mounted on the end of a respective further mounting arm which, in similar manner to the mounting arm of the center cutting unit, is pivotally connected to the frame and provided with resilient biassing means connected between the frame and the further mounting arm to increase the pressure exerted on the ground in use by the further cutting unit.

11. A mowing machine as claimed in claim 1, in which each cutting unit has a cutting cylinder driven by a hydraulic motor mounted on the cutting unit and supplied with hydraulic fluid from a pump adapted to be connected to the power take-off shaft of the tractor.

12. A mowing machine as claimed in claim 1 and mounted on the three-point linkage of a tractor, in which each lifting rod of the tractor three-point linkage is connected to the lower arm on which it acts through a short additional link member which is pivotally connected at respective opposite ends to the lower arm and the lifting rod, thereby to allow some movement of the frame of the machine about a horizontal axis parallel to the direction of travel of the tractor.

13. A mowing machine as claimed in claim 1, in which the biassing means are adjustable thereby to adjust the increase in pressure with which the center cutting unit bears on the ground.

* * * * *